United States Patent [19]

Foster

[11] 4,272,930
[45] Jun. 16, 1981

[54] MODULAR HOUSING SYSTEM
[75] Inventor: Manford H. Foster, Houston, Tex.
[73] Assignee: Roy H. Smith, Jr., Bellaire, Tex.
[21] Appl. No.: 910,575
[22] Filed: May 30, 1978

Related U.S. Application Data

[63] Continuation of Ser. No. 628,468, Nov. 4, 1975, abandoned.
[51] Int. Cl.³ ............................................ E04H 12/14
[52] U.S. Cl. ........................................ 52/79.1; 52/271; 52/584; 52/646; 52/713
[58] Field of Search ............... 52/645, 646, 79, 582, 52/584, 753.6, 285, 270, 271, 272, 585, 586, 713; 403/49, 409

[56] References Cited

U.S. PATENT DOCUMENTS

| | | | |
|---|---|---|---|
| 1,362,764 | 12/1920 | Warner et al. | 52/285 |
| 1,689,642 | 10/1928 | Rappleyea | 52/580 |
| 2,140,772 | 12/1938 | Slayter et al. | 52/580 |
| 2,355,192 | 8/1944 | Wachsmann et al. | 52/272 |
| 2,887,740 | 5/1959 | Potchen . | |
| 3,512,316 | 5/1970 | Pass | 52/92 |
| 3,512,325 | 5/1970 | Nichols | 52/584 |
| 3,645,162 | 2/1972 | Welch | 52/285 |

FOREIGN PATENT DOCUMENTS 117947 12/1943 Australia ............................... 52/753 G

Primary Examiner—Carl D. Friedman
Attorney, Agent, or Firm—Roy H. Smith, Jr.

[57] ABSTRACT

A modular housing system made up of wall panel units, roof panel units and floor panel units. Each unit is a framework made up of members which are preferably wooden or metal 2×4's or other readily available shape. The units are uniformly predrilled for connectors in such manner that they can be readily rotated into a variety of orientations and yet register with the connector holes in the adjacent unit.

The system utilizes a novel removable connector also disclosed herein, an elongated headed pin having at its opposite a pair of parallel chordal slots adapted to receive both a serrated locking plate and a tapered wedge. The locking plate is disposed next to the wood and the wedge is tapped into locking position on the plate by motion parallel to the surface of the wood. It can not be unlocked by motion in the opposite direction, but can be removed simply by prying up on the end spaced away from the pin hole.

8 Claims, 14 Drawing Figures

MODULAR HOUSING SYSTEM

This is a continuation of application Ser. No. 628,468, filed Nov. 4, 1975, now abandoned.

BACKGROUND OF THE INVENTION

The field of this invention is modular housing systems.

Prior workers in the art have conceived various modular housing systems with a certain amount of interchangeability, one of whom was George W. Rappleyea. In the patent issued to him in 1928, U.S. Pat. No. 1,689,642, Rappleyea discloses such a system in which his wall panel units are uniformly drilled, so that one wall panel can be removed and exchanged with another in a different location. The change, however, is limited to linear translation. A close reading shows that each of the Rappleyea wall panels has a fixed top end, bottom and sides, and can not be rotated about either a vertical axis or a horizontal axis without destroying its fit to the balance of his building. Such a limitation is a disadvantage to the builder, as it requires him to stack and move his panels in particular ways to avoid waste motion, and limits the pool of unskilled labor he can draw upon.

Another pair of prior inventors are Wachsmann and Gropius, who disclosed a prefabricated building in 1942, in U.S. Pat. No. 2,355,192. Their wall panels have a disadvantage similar to Rappleyea's, for the surfaces of their frameworks intended for the inside surfaces of their buildings are contoured somewhat differently than their outside surfaces. More significantly, the wooden members they employ as studs, for instance, are all specially prepared to form connections of 4 members butting together to form a cross even when only two panels are joined in a flat wall. They also employ a rather complicated metal connector which has many parts fitting into grooves and slots formed in the wooden studs. Each stud must be twice chamfered for such an interfit, and then routed to provide the grooves and slots, requiring some expertise in cabinetry. Such a system is so complex and costly that it is small wonder that it is not seen on the commercial market.

The most relevant art with respect to wedge connectors appears to be disclosed in Australian Pat. No. 117,947, issued in 1944 to L. F. Irwin. Irwin discloses a headed dowel connecting a pair of timbers, the free end of the dowel cooperating with a wedge having a tapered slot which is driven transversely to the dowel axis, the sides of the slot digging into the dowel to put it in tension. Irwin discloses nothing to prevent loosening of the connection by motion of the wedge in the opposite direction, and none has been found.

SUMMARY OF THE INVENTION

It is the object of this invention to provide a new and improved modular housing system that uses typical building materials, such as wood-framing members, in modular panel units to provide a modular housing system which can be assembled and disassembled on location.

In the preferred embodiment of this invention, a modular housing system is provided which includes a floor assembly and a plurality of wall panel units mounted onto the floor assembly. Each of the wall panel units includes frame members which are interconnected into a rectangular form. A floor-wall connector means is provided for releasably attaching the wall panel units to the floor assembly. And, wall connector means releasably connect the adjacently positioned wall units together. A plurality of roof panel units wherein each roof unit includes frame members interconnected in a generally rectangular form are mounted onto the connected wall panel units; and, roof connector means releasably connect the roof panel units to the wall panel units whereby the housing system can be assembled on location and later disassembled prior to moving.

The floor-wall connector means of this invention includes a plurality of pins removably mounted in the floor assembly. Each of the floor pins has an end portion with a double slot, the end portion extending upwardly and outwardly of the floor assembly. The wall panel units are mounted onto the floor assembly and the frame members of the wall panel units have spaced openings therein such that the floor pin end portions extend through the openings in one of the wall frame members. A plurality of wedge elements are mounted over the floor pin end portions in engagement with the double slot of the pin end portion and with the frame member through which the pin extends. The wedge element is movable between a released position and a wedged position in which the floor pin is placed in tension thereby securing the wall panel units to the floor assembly. The wall connector means and roof connector means are of a similar design.

The features of this invention which have just been referred to are exemplary only of the total number of features which are patentably significant. Thus, the summary of the invention is not intended to fully represent the entire patentable significance of the inventions set forth herein, which inventions will be distinctly described in the claims.

DESCRIPTION OF THE PREFERRED EMBODIMENT

Referring to the drawing, the letter H generally designates the modular housing system of the preferred embodiment of this invention. The modular housing system H can be entirely fabricated in modular form off location and then moved to location for assembly. Thereafter, and whenever necessary, the modular housing system H of this invention can then be disassembled for reuse elsewhere or for any other reason.

Figure 1:
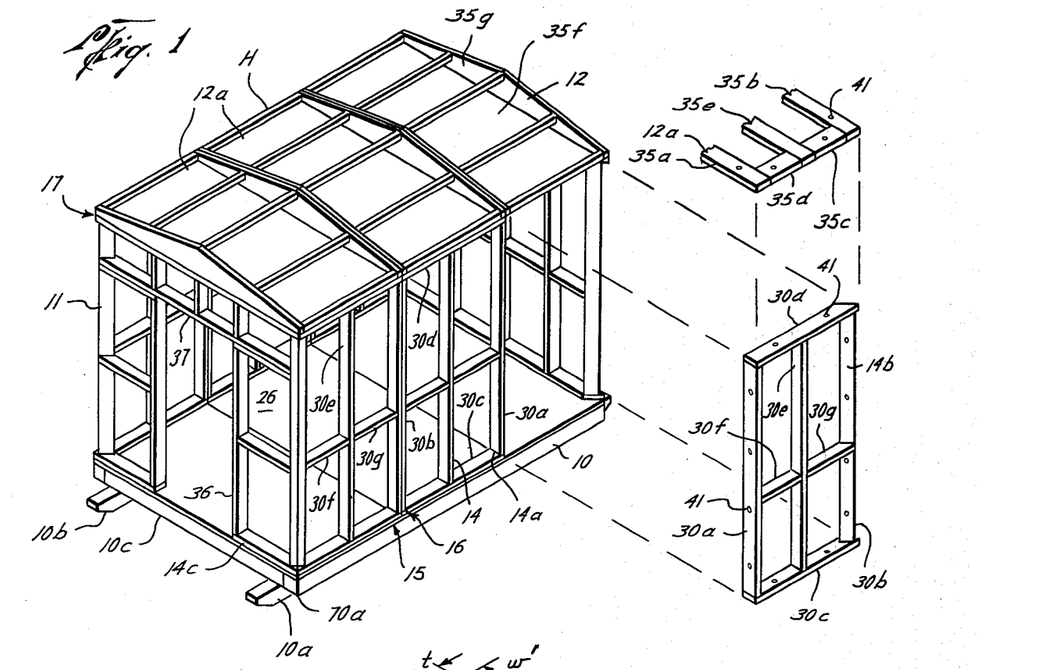
FIG. 1 is an isometric view of the modular housing system of the preferred embodiment of this invention with a corner wall panel unit being removed for illustration.

The modular housing system H of this invention basically includes a floor assembly 10, a wall assembly 11 and a roof assembly 12. The wall assembly 11 includes a plurality of modular wall panel units 14 which are releasably connected to the floor assembly 10 by a plurality of floor-wall connector means generally designated by the number 15. The individual wall panel units 14 include intermediate wall panel units 14a and corner wall panel units 14b which are connected to each other by wall connection means generally designated by the number 16. The roof assembly 12 is formed of a plurality of roof panel units 12a which are releasably connected to the wall panel units 14 by a roof connector means generally designated by the number 17.

FLOOR ASSEMBLY

Figure 2:
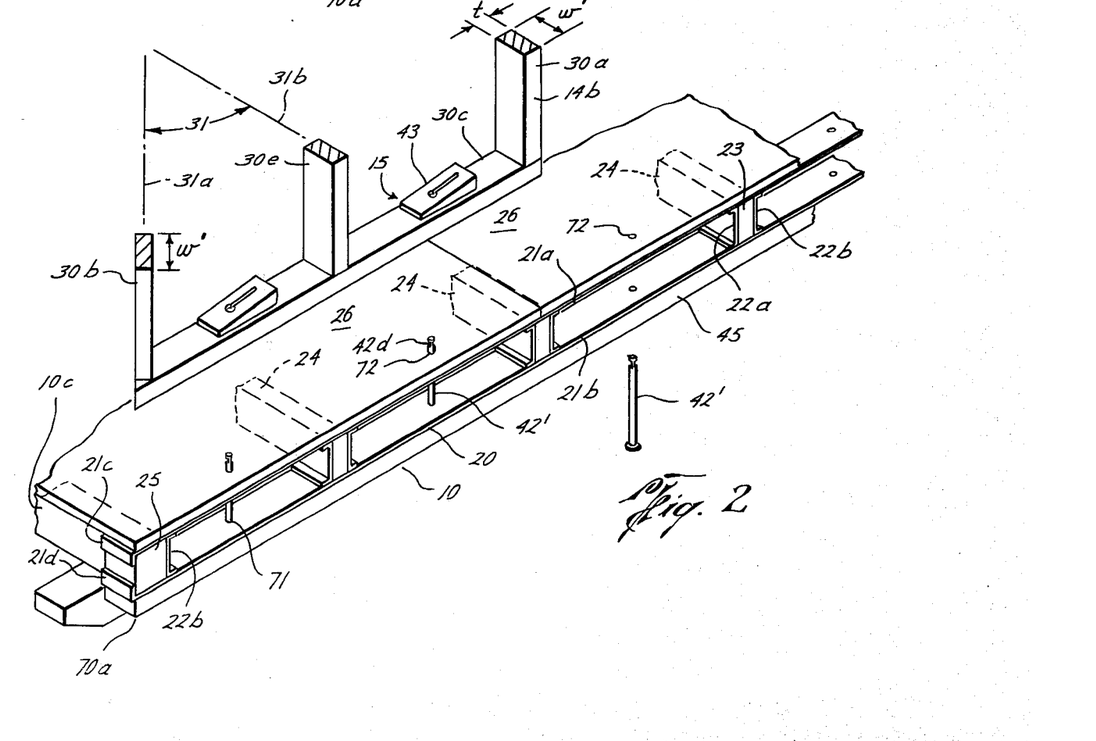
FIG. 2 is a detailed view of the connection between the floor assembly and a wall panel unit of this invention.

The floor assembly 10 is illustrated in detail in FIG. 2. The floor assembly 10 includes two longitudinally extending base members 10a (which may be beams that are commonly known in the construction field as "4×4") that form a skid to support the system H on various terrains. A front transverse beam 10c is mounted onto the longitudinally extending side beams 10a and 10b. Similarly, a rear transverse beam (not shown) is positioned at the rear portion of the system H. The front beam 10c and the rear beam are positioned transversely and connected to a multiple joist support 20.

The multiple joist support 20 includes an upper, elongated support member or plate 21a and a lower, elongated support member or plate 21b which are connected together by a plurality of C-shaped channel supports 22a and 22b. The channel supports 22a and 22b are positioned sufficiently apart to cooperate with the upper and lower support members 21a and 21b to provide a recess 23 to receive and support transversely extending beams or joists 24. A front end portion 21c of the top joist support 21a is bent downwardly and a front end portion 21d of the lower joist support member 21d is bent upwardly. These bent end portions 21c and 21d cooperate with a C-shaped channel member 22b to provide a recess 25 to receive the transversely extending front support beam 10c. A similar rear end recess is provided at the rear end of the multiple joist support (not shown). The floor assembly 10 further includes floor portions or sheets of weight supporting material 26.

WALL ASSEMBLY

The intermediate wall panel units 14a and the corner wall panel units 14b are similar in construction. Referring to FIG. 1, the intermediate wall panel unit 14a includes vertically extending frame members or studs 30a and 30b which are interconnected by nails or other means by a bottom frame member or plate 30c and a top frame member or plate 30d. Suitable internal bracing or intermediate framing is provided by an intermediately vertically extending stud or frame member 30e which is positioned by the horizontally extending internal frame members 30f and 30g. All of these frame members 30a–30g are connected together by nails; however, it is within the scope of this invention to connect these framing members 30a–30g together by any suitable means. The purpose of this invention is to provide a modular housing system H which utilizes for panel members such as 14a well known and readily available standard building materials. For example, all the studs and framing members 30a–30g are made of frame members generally known as "2×4s". A 2×4 is a conventional framing member which is nominally four inches in width w' and nominally two inches in thickness t. The frame members 30a–30e are connected together transversely with respect to each other. The term "transverse" as used herein with respect to wall panel units 14a and 14b means that the width of the connected frame members 30a–30e is equal to the nominal width w', which in the case of 2×4 utilization is a nominal four inches.

The corner wall panel units 14b are similar in construction to the intermediate wall panel units 14a. Therefore, in describing the corner wall panel units 14b, the same numbers and letters will be utilized to describe the framing members wherever possible. The corner wall panel units 14b include side frame members or studs 30a and 30b which are connected in a generally rectangular form to bottom and top frame members, 30c and 30d, respectively. Internal frame supports 30e, 30f and 30g are again provided. The difference between the corner wall panel units 14b and the intermediate wall panel units 14a involves the angular position of one of the side frame members such as 30b. Whenever one of the side frame members such as 30b of a wall panel unit such as 14b is intended to cooperate with another wall panel unit to form a corner, the angular position of the side frame member 30b is not transverse, as is the case with the side frame members 30b of intermediate wall panel units 30a. Rather, the side frame member or corner stud 30b is positioned at a 45° angle 31 with respect to the other vertically extending studs 30a and 30c which form part of the corner panel unit 14b. This angular relationship is illustrated in detail in FIG. 2 where the number 31a designates a line extending parallel to the surface of width w' of the corner stud 30b. The line 31a would intersect at a 45° angle, if continued, a similar line 31b extending outwardly from the intermediate support stud 30c.

Therefore, in order to form a corner, two corner units such as 14b are positioned at a 90° angle with respect to each other so that the studs 30b forming the corners are adjacent and parallel to each other so that they may be connected together using the wall connector means 16 which will be described in detail shortly.

ROOF ASSEMBLY

The roof panel units 12a are comprised of a plurality of frame members, which may be conventional 2×4s in one embodiment of this invention, that are connected by nailing to each other to form a generally rectangular modular roof panel unit 12a. The roof panel units 12a include transversely extending, spandrel frame members 35a and 35b which are interconnected by side frame members 35c and 35d and an intermediate frame member 35e. The frame members 35a-35e are connected together in a generally rectangular form by nailing or other suitable means. It should be understood that the description herein of the side including frame members 35c and 35d of the roof panel unit 12a is identical for the other side of the roof panel unit 12a, which is not illustrated. A sheet 35f is attached to the frame members 35a-35e to provide a ceiling; and, any suitable roof structure is attached to the frame members 35a-35e and sheet 35f. For example, a gable roof support is provided by members 35g.

The frame members 30a-30e are connected in a plane which is at 90° with respect to the plane of connection of the transversely connected frame members in the intermediate wall panel units 14a. Previously, the plane for the frame members such as 30a and 30e has been described as being "transverse" as defined by the width w' of the frame members or studs such as 30a and 30e. In the roof panel units 12a, the frame members 30a-30e are connected together "flatly", which provides an overall thickness defined by the letter t—a nominal two inches with conventional 2×4s being utilized.

A suitable doorway opening 36 can be provided by utilizing wall panel units 14c which are basically corner panel units similar to 14b, except that the overall width of the panel units will vary depending upon the size of the door opening 36 which is necessary. It may also be necessary to provide other wall panel units such as 37 to fill in wall portions such as above the doorway opening 36. The size of these panel units will depend upon the actual size of the overall building or housing system H and thus will not be described in detail. The description of the invention set forth herein will apply to other such modular housing panels such as 37 which are necessary to provide design features such as door placements for a particular housing system H under construction.

CONNECTOR MEANS

The floor-wall connector means 15, the wall connector means 16 and the roof connector means 17 are all basically identical in structure. The basic connector for each of the connector means 15-17 is the individual wedge-type connector 40 illustrated in detail in FIG. 4. The connector 40 provides a releasable connection between two adjacently positioned wall panel units such as the intermediate wall panel unit 14a and a corner wall panel unit 14b. With an intermediate panel unit 14a and a corner panel unit 14b positioned adjacent to each other, stud members 30a (or 30a and 30b) of each unit 14a or 14b are positioned side-by-side. Aligned openings or holes 41 are drilled into both the studs 30a prior to assembly into wall panel units such as 14a and 14b in such a position that the openings will be aligned to receive a pin 42. The pin 42 includes a head 42a which is larger in diameter than a main shaft portion 42b. The overall length of the main shaft portion 42b is sufficient such that a pin end portion 42c extends outwardly of aligned openings 41 in the adjacently positioned studs 30a. The end portion 42c of the pin has a double slot 42d machined therein (only one of the double slot portions being shown in FIG. 4).

Figures 3, 3A, 4, 4A:
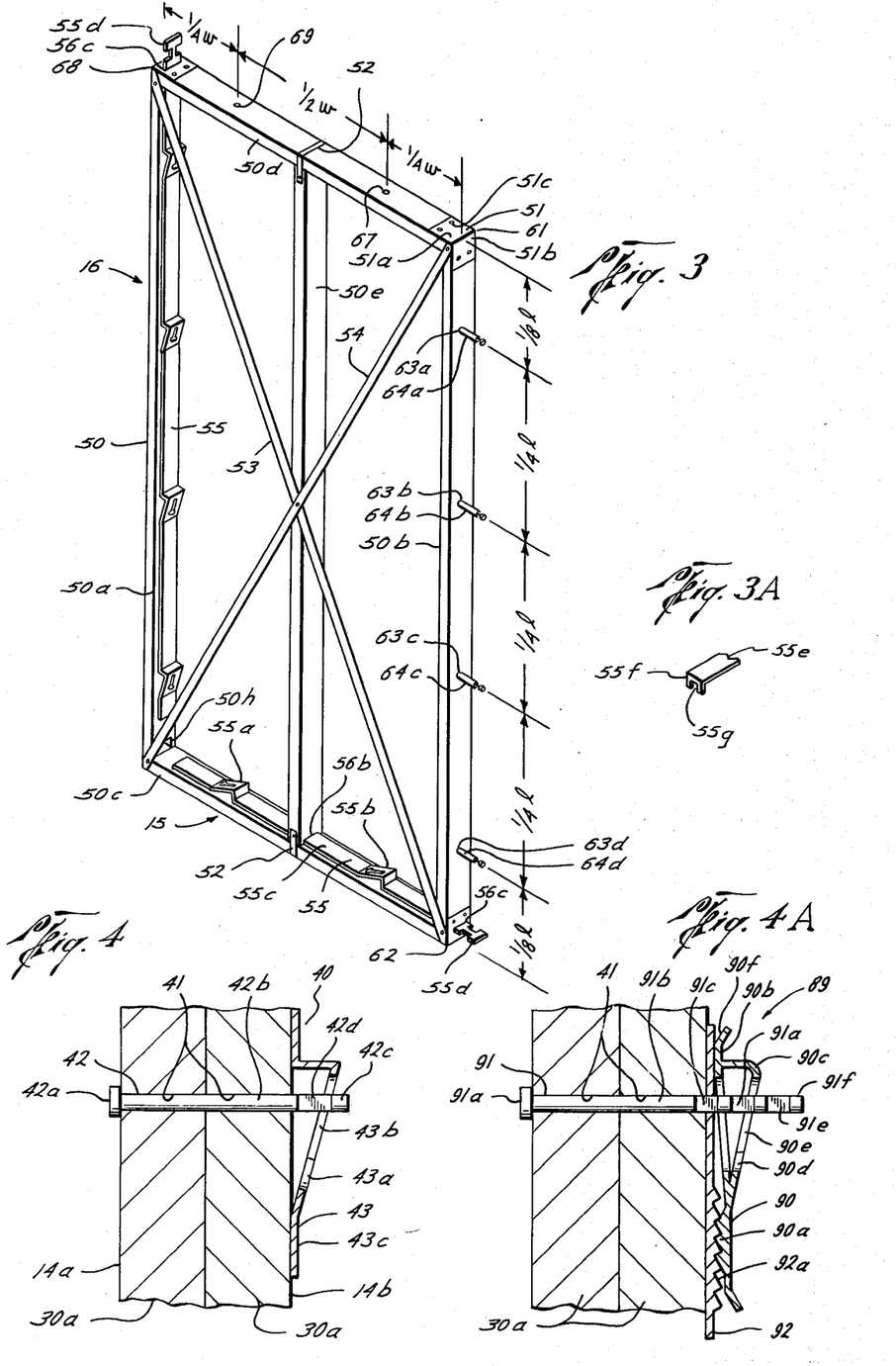
FIG. 3 is an isometric view of a wall panel unit of another embodiment of this invention.
FIG. 3A is an isometric view of one end of the wedge/shaft assembly of the wall panel unit of FIG. 3.
FIG. 4 is a sectional view of a wedge connector of this invention.
FIG. 4A is a sectional view of a lockable wedge connector of this invention.

The double slot 42d is adapted to receive a wedge element 43. Such a wedge element 43 is presently known and being used as described in the patents referred to in the Background of the Invention herein. Such a wedge element generally includes an inclined surface 43a having a slot 43b therein. The inclined surface 43a is integrally connected to a rim portion 43c over the pin end portion 42c by insertion of the pin in an enlarged portion of the slot 43b. The edges of the slot 43b in the wedge element 43 are then positioned in the double pin slot 42d. The wedge element 43 is then moved transversely along the adjacent stud 30a such that the wedge element 43 engages the stud 30a and the pin 41 and wedges therebetween such that the stud 41 is placed in sufficient tension to releasably connect together the wall panel units 14a and 14b.

Whenever it is necessary to release the wedge element 43, it is moved in the opposite direction from connection. The wedge-type connector 40 is utilized for each set of aligned openings 41 in adjacently positioned, vertically extending stud members 30a or 30b of the wall panel units 14a and 14b. In addition, the same wedge-type connectors 40 are utilized to make connections between aligned openings 41 in the top frame members 30d of the wall panel units 14a and 14b and openings 41 in the roof frame members 35a, 35b, 35c or 35d. In this manner, the wedge-type connectors 40 act to provide not only the wall connector means 16 for connecting together adjacently positioned wall panel units such as 14a and 14b; but also, the wedge-type connectors 40 provide the releasable connection means 17 between the top of the wall units 14a and 14b and the roof panel units 12a.

The floor-wall connector means 15 illustrated in FIG. 2 also utilizes the wedge-type connectors 40 of FIG. 4. The only difference is that the pins 42' may be longer in order to extend through a bottom support beam 45 positioned under the multiple joist support or hanger 20, through the openings 71 and 72 in the elongated joist support members 21b and 21a, and through openings 41 in the bottom frame members 30c of the wall panel units 14a and 14b. The wedge elements 43 are wedged between the frame members 30c and the double slots 42d therein in order to attach the wall panel units 14a and 14b to the floor assembly 10.

Referring to FIG. 3, another embodiment of the floor-wall connector means 15 and wall connector means 16 is illustrated. The panel unit 50 illustrated in FIG. 3 is basically identical to the intermediate wall panel unit 14a illustrated in FIG. 1. Vertical studs or frame members 50a and 50b are connected by nailing to a bottom stud 50c and a top stud 50d. Intermediate support stud 50d extends vertically between the top and bottom studs.

In the embodiment illustrated, brackets are utilized to actually connect the various frame members together. An L-shaped corner bracket 51 is positioned at each corner in order to support the two frame members 50a and 50d forming the corner at right angles with respect to each other. Each of the bracket members 51 includes a first bracket portion 51a which is integrally formed with and perpendicular to a second bracket portion 51b. Each of the bracket portions have nail holes such as 51c for receiving nails to mount the bracket onto the two mutually perpendicular frame members such as 50d and 50a to support the same at a right angle. Further, U-shaped band members 52 may be mounted over the bottom and top frame members 50c and 50d, respectively, to extend over the intermediate support stud 50e and be attached to the stud 50e by nailing. In addition, X-shaped banding is provided by metal banding members 53 and 54 which crisscross at the center of the intermediate support stud 50e and are attached by nails or otherwise to each of the corners of the entire panel 14a. Such banding is known in the art and is provided to maintain the panel in its rectangular form.

Instead of individual wedges, an actuator wedge/shaft assembly 55 is slidably mounted onto the bottom plate 50c. The wedge/shaft assembly 55 includes wedge portions 55a and 55b which are connected to move as a unit by the flat shaft portions 55c. The basic wedge portions 55a and 55b are basically identical to the wedge member 43 previously described and thus need not be described in detail. The shaft 55c terminates in an end portion 55d which extends outwardly of the vertical stud 50a through slot. The end portion 55d may include a slot portion to receive a tool or the end portion 55e of another wedge/shaft assembly 55 in an adjacently positioned panel unit. The end portion 55e includes a bent end 55f having a slot 55g to fit over end portion 55d. If another panel unit is adjacently positioned, the panel unit 50 has an opening 50h to receive end portion 55d.

Another wedge/shaft assembly 55 is slidably mounted onto the frame member 50c by slots 56a and 56b in frame members 50a and 50e, respectively. The wedge/shaft assembly 55 is adapted to receive the floor pins 42' and releasably lock the wall unit 14a and other similar wall units including the corner units 14b onto the floor assembly 10. Similarly, a wedge/shaft actuator assembly 55 is slidably mounted onto the stud 50a in order to receive pins extending outwardly from another wall panel unit 14a and releasably attach the two wall panel units together. The wedge/shaft assembly 55 is identical to the wedge/shaft assembly described as being slidably mounted on the member 50c. Thus the end portion 55d extends outwardly of the opening 56c in the top stud 50d in order to allow a suitable tool to move the entire wedge/shaft assembly 55 as is necessary to releasably lock the wall unit 14a to another intermediate wall unit 14a or a corner wall unit 14b. A similar wedge/shaft assembly 55 may be slidably mounted onto the roof frame members 35a, 35b, 35c and/or 35d in order to releasably lock the roof panel units 12a onto the top studs 50d or 30d of the intermediate wall panel units 50 and 14a, respectively.

The housing system H of the preferred embodiment of this invention has been described as being modular. One of the features herein is the proper placement of the holes 71, 72, and 41 in the various frame members of the floor assembly 10, the wall assembly 11 and the roof assembly 12 so that the individual wall panel units 14 and the roof panel units 12a can be freely used in any system H that is the same size. In order to accomplish this, it has been necessary to derive a spacing system for the openings 41 in the various frame members which provide for this interchangeability.

The intermediate wall panel unit 50 utilizing the wedge/shaft assembly 55 illustrated in FIG. 3 also illustrates the hole spacing system utilized for all units including 12, 14a and 14b. The overall height of the panel 50a is defined by the letter l. The overall width of the panel 50 is defined by the letter w. The width w of the panel 50 is one-half of the length l. The spacing of holes for pins along the length l is defined by the formula: $\frac{1}{8}l + \frac{1}{4}l + \frac{1}{4}l + \frac{1}{4}l + \frac{1}{8}l$. This provides a total of four openings 63a–63d from corner 61 to corner 62 of the stud 50b with the distance between intermediate pins such as 64a and 64b being twice the distance between the pins such as 63a and the corner 61.

For the width w of the panel 50, the number of openings for this is two, 67 and 69. The spacing of these openings or holes 67 and 69 is determined by the formula: $\frac{1}{4}w + \frac{1}{2}w + \frac{1}{4}w$.

For the openings such as 71 and 72 in the floor assembly, the positioning of these holes is the same as that for panel width w so that the openings in the bottom plates such as 30c of 14a will match openings 71 and 72 in the floor assembly.

A number of other details of the invention are illustrated in the drawing, FIGS. 3 and 4 in particular. For one thing, all of the opening 41, 63a–63d, 67 and 69 are formed transversely of the surfaces through which they extend, in other words they are perpendicular to such surfaces of the studs and plates defining the periphery of the wall frame unit. For another thing, such holes are all drilled midway of the width or thickness of the studs and plates, so that all of them are centered in a common plane bisecting the unit between its front and back surfaces.

In addition, it will be apparent that the described spacing is dictated, in part, by the number of connectors between abutting framing members of adjacent panels. Where only four connectors are used to join a pair of studs such as 50b, as in the above example, the overall length "l" is divided by 4 to obtain a hole-to-hole spacing of $\frac{1}{4}$. Naturally a connector hole will not be located at either extremity of the length l, so this hole-to-hole spacing does not, in and by itself, determine the complete spacing pattern. There still remains the question of where to locate the holes closest to the top and bottom corners of the framing panel.

In the above formula, this qestion has been resolved by halving the hole-to-hole spacing and using the result half spacing, "$\frac{1}{8}$" in the example using 4 connectors, as the specing between each corner and the first hole along the length l of the panel. The result is a hole pattern symmetric in a horizontal plane bisecting the framing panel at mid-height, i.e., each hole above the plane of symmetry has a mate below such plane and at the same distance from it.

Such symmetry is of considerable importance to the builder, for it means that he can utilize identical panels all predrilled according to such a common pattern without having to be concerned about a particular orientation. When any one panel is held in place and a second is to be connected to it side-by-side, the second panel may be disposed in four different manners-either end up and either side abbutting the first panel-and yet the builder will be confident that the pre-drilled holes in a stud of the second panel will be aligned with the corresponding holes in a stud of the first panel. In other words, no framing panels has a top and bottom, and no left dise and right, just two ends and two sides.

When the framing panels 50 and 14a have a width "w" equal to half the length "l" of the same panel, there is an additional advantage in using half the number of roof (and floor) connector and using the same hole spacing as along the length, e.g., w/2 = $\frac{1}{8}$ between corners and ends holes in FIG. 3. This makes it possible to turn a wall framing unit sideways, and stack one on top of the other with the studs extending horizontally, to occupy the same space in the wall that would otherwise be occupied by two units having their studs disposed in the normal fashion, i.e., vertically. Again, with the uniform hole spacing pattern described, each of the sideways panels can be oriented in four different ways with respect to the panel it is to be conncted to, using only the pre-drilled holes and without any on-site adjustments.

The above applies in particular to intermediate wall framing panels, i.e, those constructed to be joined at each to another panel so that the two panels form a continuous straight wall section. Since in a corner panel one of the side studs is cocked at an angle with respect to the front and back of the panel, not quite so much flexibility is present; for any given location, there is a top, a bottom and left and right sides. However, by adhering to the same hole spacing pattern it will be evident that only one type of corner panel will be necessary for an entire building, i.e., all corner panels may be identical. Thus if two corner panels are joined together to form a right angle, it will be evident that they may be interchanged by rotating either 90 degrees into the space occupied by the other and then rotating it 180 degrees about a horizontal axis at the middle of its height. Thus an entire set of walls may be constructed with one set of identical intermediate panels and one set of identical corner panels, plus special panels for doorways and some intermediate panels modified to accomodate windows.

NON-ALIGNED WALL UNITS

Figures 5, 6, 7, 8:
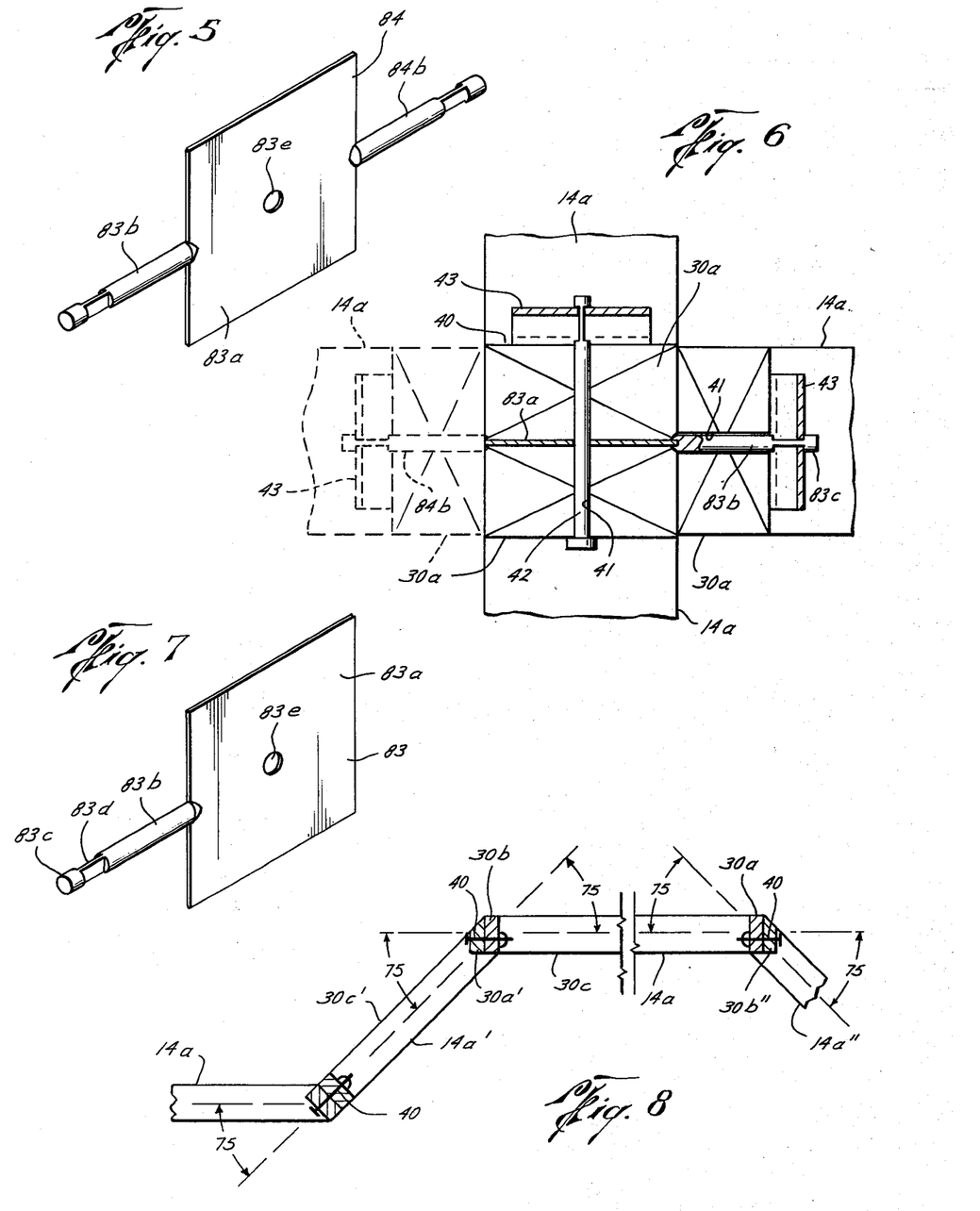
FIG. 5 is an isometric view of a deviation connector for connecting a third and fourth panel to adjacently connected first and second panels.
FIG. 6 is a sectional view which is partly schematic of a connection utilizing the deviation connector of FIG. 5.
FIG. 7 is an isometric view of a connector for adding a third panel at a right angle to adjacently positioned first and second panels.
FIG. 8 is a sectional view illustrating the connection of adjacent wall panel units at acute angles with respect to each other.

The wedge-type connector 40 is illustrated schematically in a wall having non-aligned, but connected wall panel units. Referring to FIG. 8, wall panel units 14a are illustrated as being connected to wall panel units 14' and 14a" at an acute angle 75 in order to allow the housing system H to have flexibility in wall direction yet maintain the modular concept utilized herein. Since each of the wall panel units 14a, 14a' and 14a" basically utilized the same generally rectangular configuration and frame members, the same numbers will be utilized wherever possible.

The centrally positioned wall panel unit 14a is identical to that described in FIG. 1 and thus includes studs 30a and 30b which are interconnected by the bottom stud or frame member 30c. Of course, the top frame member of this panel unit and the other panel units are not illustrated, but the utilization thereof is obvious in view of the description of the lower portion of the unit herein. In order to releasably attach the wall panel unit 14a' at an angle 75 with respect to the unit 14a, the bottom frame member 30c' mounts the stud 30a' at the angle 75 so that the stud 30a' will fit adjacent to and parallel with the stud 30b of the unit 14a. In this manner, the releasable connection means 40 may be utilized as previously described. On the other side of the central unit 14a, the same principle is applied. The stud 30b" is positioned in the same transverse plane as the member 30a. Therefore, the stud 30b" is positioned at an angle 75 with respect to the bottom frame member 30c". In this manner, the wall panel units such as 14a may be mounted at acute angles with respect to each other as desired.

Further, one or more additional wall panel units 14a 81 are mounted at right angles with respect to adjacent, joined wall panel units 14a utilizing the T-deviation connector 83 (FIG. 7) or the X-deviation connector 84 (FIG. 5). Referring first to FIG. 6 and FIG. 7, the deviation connector 83 is illustrated in solid lines in FIG. 6 as connecting an additional wall panel unit 14a to the two panel units 14a connected together by the wedge-type connector 40 of FIG. 4. Utilizing the same identification numbers and letters for the wedge-type connectors 40 in FIG. 6 as in FIG. 4, the pin 42 extends through the two adjacent studs 30a and is releasably held in place by the wedge 43. T-deviation connector 83 includes a plate 83a having welded or otherwise attached thereto a shaft or pin 83b terminating in an end portion 83c. The end portion 83c has a double slot 83d machined therein. And, an opening 83e is positioned centrally of the plate 83a. The T-deviation connector 83 is mounted between the studs 30a of adjacently positioned wall panel units 14a in alignment with the aligned holes 41 in the adjacent studs 30a so that the pin 42 will support the connector 83 between the studs. The pin portion 83b extends outwardly thereof and is insertable through an opening 41 in a stud 30a of another wall panel unit 14a which is positioned to extend outwardly from the point of connection of the two aligned, adjacent wall panel units 14a. The end portion 83c of the pin 83 extends outwardly such that a wedge element 43 releasably attaches the panel unit 14a to the aligned panel units 14a at a right angle with respect thereto.

The X-connector 84 can be utilized to attach a fourth panel unit 14a shown in scored lines in FIG. 6 to the other three panel units 14a to form a cross-type connection. The connector unit 84 is basically identical to the connector unit 83 and thus the same numbers and letters will be used to identify the same parts. Thus a connector plate 83a has a centrally located opening 83e therein and a pin 83b extends outwardly from one side thereof. A second pin 84b extends outwardly from the other side of the connector plate 83a in alignment with the pin 83b. The pin 84b is illustrated in schematic lines in FIG. 6 and cooperates with a wedge element 43 to releasably connect the stud 30a of a fourth panel member 14a with the other three panel units 14a.

LOCKABLE WEDGE-TYPE CONNECTOR

Referring to FIG. 4A, another embodiment 89 of the wedge-type connector 40 is illustrated. The connector 89 includes a wedge element 90, a pin 91 and a lock plate 92. The mutually adjacent studs 30a have aligned openings 41 to receive a pin. In the embodiment illustrated in FIG. 4A, the pin 91 includes an enlarged head portion 91a; pin 91 further includes a shaft portion 91b having a plurality of sets 91c, 91d and 91e of double slots. The pin end portion 91f including one or more of the sets of double slots such as 91d and 91e extends outwardly from the adjacent studs 30a. The spatial placement of a plurality of sets of slots 91c–91e is provided for positioning one set of slots such as 91d in FIG. 4A for receiving a wedge element 90 even though the actual thickness of the combined, adjacent studs such as 30a may vary with the size of studs utilized.

The wedge-type connector 90 of FIG. 4A is adapted to be locked in place against the lock plate 92. The lock plate 92 includes an opening to mount over the pin end portion 91f. The lock plate 92 may be made of any suitable metal and includes a serrated portion 92a which is adapted to receive a cooperating serrated portion 90a on the wedge element 90. The wedge element 90 includes a rim portion 90b which surrounds the wedge portion 90c having a planar surface portion 90d having slot 90e therein. The planar portion 90d and the slot 90e are basically identical to the planar portion 43a and the slot 43b previously described with respect to the wedge-type connector 43. The rim portion 90b includes a surface portion 90f which is positioned to engage against the lock plate 92 and provide the pivot point for the wedge element 90 in response to the insertion of any suitable tool between the serrated portions 90a and 92a of the wedge element 90 and lock plate 92, respectively. In this manner, the wedge element 90 in cooperation with the lock plate 92 can be locked into a wedged position and be maintained in such wedged position until released by pivotal separation causing a separating of the serrated portions 90a and 92a.

FLOOR ASSEMBLY OF FIG. 9

Figure 9:
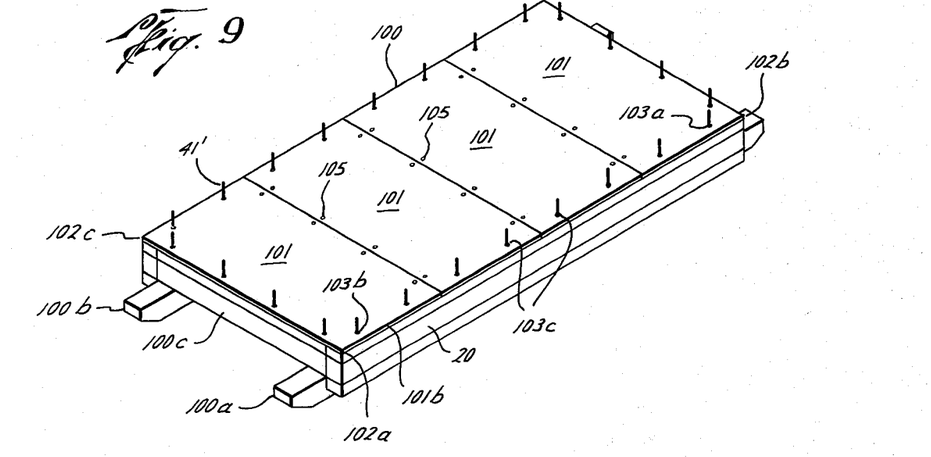
FIG. 9 is an isometric view of another embodiment of the floor assembly utilizing modular floor panel units.

Referring to FIG. 9, a floor assembly 100 is illustrated. The floor assembly 100 is an alternative to the floor assembly 10 illustrated in FIG. 1. Longitudinally extending base members 100a and 100b act as skids to support the floor assembly 100 on various surfaces. Transversely extending base members include a front base member 100c and an identical base member (not shown) positioned at the rear of the assembly 100. The multiple joist support 20 receives the front base member 100c as well as the rear base member for supporting same in a manner previously described with respect to floor frame member 10c.

Modular floor panel units 101 are mounted onto the top of the multiple joist support members 20 and are positioned adjacent to each other to provide an alternative floor structure for the housing system H. Each of the modular base units 101 has a frame identical to that described for the modular roof units 12a illustrated in FIG. 1. Floor portions are provided by weight-supportive sheet 101b mounted onto each set of frame members 35a-35e. The basic framework formed by frame members 35a-35e of the roof units 12a is entirely interchangeable with the framework for the modular floor units 101 and for the roof units 12a. This is tue even for the spacing of the openings in the frame members which has been previously described. A plurality of floor pins 41' are illustrated as extending upwardly of the openings in the modular floor units 101.

Figure 10:
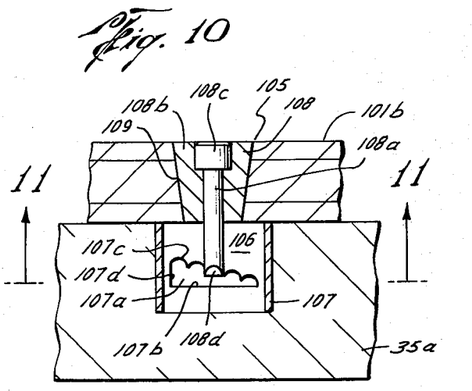
FIG. 10 is a sectional view of a floor portion connector for attaching the sheet forming the floor portion to the framework of the floor panel units.
Figure 11:
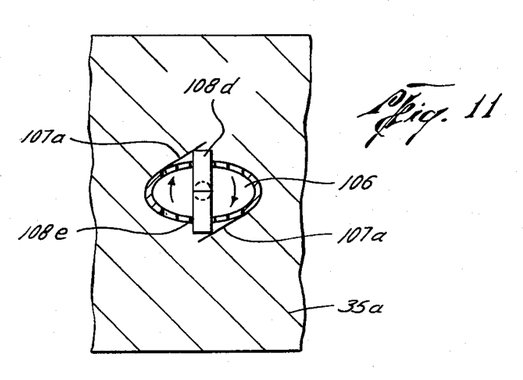
FIG. 11 is a sectional view taken along line 11—11 of FIG. 10 further illustrating the floor portion connector of FIG. 10.

The sheets of weight-supportive material 101b are attached to the frame work 35a-35e by a plurality of sheet connector means generally designated by the number 105. One of such sheet connector means is illustrated in FIGS. 10 and 11 for connecting a sheet 101b to a frame member 35a. A substantially oval recess 106 is machined by suitable means in the frame member 35a and elliptical sleeve 107 is mounted therein. The elliptical sleeve 107 includes two substantially triangular flaps or cleats 107a which have been cut along lines 107b and 107c and are pivotal outwardly from the sleeve at 107d. These triangular flaps or cleats 107a are pushed outwardly into the material of the frame members 35a in order to hold the sleeve 107 in position. The upper edge 107c includes notch portions 107e. A fastening element 108 is mounted in a conically-shaped opening 109 in the sheet 101b. The fastening element 108 includes a shaft portion 108a which is mounted in a conically-shaped plug portion 108b substantially the same size as the opening 109. The shaft portion terminates in a bolt head 108c such that the shaft portion may be rotated by a suitable tool. The shaft portion terminates in flared or radially extending end portions 108d and 108e. The flared end portions 108d and 108e are adapted to be rotated by rotation of the shaft 108a into the sleeve openings left by the cleat portions 107a. The end portions 108d and 108e are adapted to engage the notched edge 107c and are thus held in position thereby. In this manner, the fastener element 108 can be utilized to releasably mount the sheets 101b onto the frame members such as 35a. The inclined angle of the notched portions provides flexibility in the use of the sheet connector with different thicknesses of floors.

SINGLE JOIST SUPPORT

Figure 12:
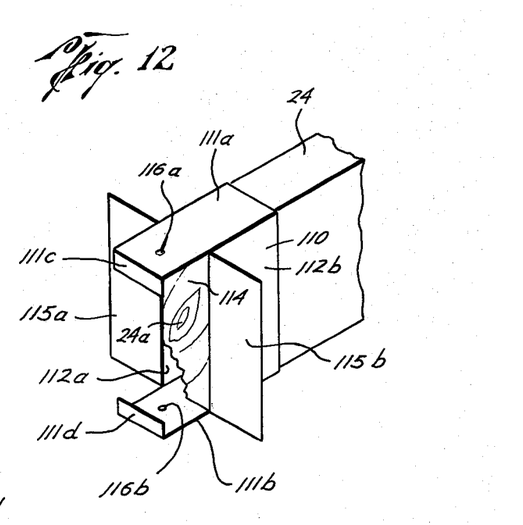
FIG. 12 is an isometric view of a single joist support of another embodiment of this invention for use as part of the floor assembly.

Referring to FIG. 12, a single joist support 110 is illustrated for supporting individual joists 24 in parallel alignment in the place of multiple joist support 20 of FIG. 2. The single joist support 110 includes top and bottom plates 111a and 111b which are connected to side plates 112a and 112b to provide a rectangular member having a rectangular recess 114 to receive end 24a of each joist. Side mounting plates 115a and 115b are integrally formed with joist recess side plates 112a and 112b, respectively, and are positioned at 90° with respect thereto in order to be positionable adjacent to and extend parallel to the supporting stringer or frame member (not shown) which runs perpendicular to the plurality of joists 24. The rectangular recess 114 allows the joist end portion 24a to be positioned flush with the side support plates 115a and 115b. The top plate 111a has an opening 116a therein and the bottom plate has an opening 116b in order to receive a nail or the like to mount the single joist support 110 onto the stringer. In addition, the top plate 111a includes an overlapping end portion 111c which cooperates with an overlapping end portion 111d on the bottom plate 111b to further mount and support the joist support 110 on the stringer.

The foregoing disclosure and description of the invention are illustrative and explanatory thereof, and various changes in the size, shape and materials as well as in the details of the illustrated construction may be made without departing from the spirit of the invention. For example, for panel units such as 14a, the bottom frame member 30c and the top frame member 30d are also known as plates; and the studs 30a and 30b are also termed frame members.

It is within the scope of this invention to attach frame members or plates such as 30c and 30d to studs such as 30a and 30b on adjacently positioned units 14a and/or 14b. For example, a panel such as 14a may be rotated 90° such that the frame member 30d is adjacent a stud 30a of the adjacently, normally positioned unit 14a. Such flexibility in positioning is available because of the hole spacing provisions described.

I claim:

1. In a modular housing system which includes a number of wall panel units disposed in line and abutting one another to form a wall and connector means extending between abutting frame members of such wall panel units, said connector means including:

a pin extending through aligned openings in adjacently positioned frame members of adjacently positioned wall panel units;

said pin having an end portion extending outwardly of said adjacently positioned frame members, said end portion having a pair of oppositely positioned slots;

a lock plate having an opening wherein to receive said pin end portion, said lock plate being positioned against said frame member from which said pin end portion extends outwardly; and a wedge member mounted onto said pin end portion for engaging said pair of oppositely positioned slots;

said wedge member being movable between a released position and a wedge position in which said wedge member is wedged against said lock plate and said pin end portion, holding said pin in tension to attach said adjacent frame members to each other;

said lock plate and wedge member having serrated portions which intersect to lock said wedge member in said wedged position, both said serrated portions being spaced from their respective opening portions engaging said pin end for separation of the wedge member from the lock plate by lifting up on the end of the wedge member adjacent its serrated portion.

2. A new and improved wedge-type connector adapted to engage a pin extending through adjacently positioned framing members for releasably connecting the framing members together, comprising:

a wedge member having both a wedging surface and a parallel surface, said surfaces diverging from one another and said wedging surface being disposed at an inclined angle with respect to the plane of at least one of said framing members while the parallel surface is parallel to the same plane, said inclined wedging surface having a tapered slot therein adapted to receive a pin and engage a portion of said pin such that said wedge member is movable parallel to said plane of the framing member between a released position and a wedged position in which said pin is placed in tension, thereby connecting together said adjacently positioned frame members; and a lock member between said plane of the framing member and the parallel surface of the wedge member for locking said wedge member in a wedged position from which it can not be loosened by movement parallel to said plane, said wedge member and lock member having pin-receiving opening portions and interengaging serrated portions both spaced from said opening portions, said wedge member being separable from the lock member by lifting up on the end of the wedge member adjacent its serrated portion.

3. In a modular housing system which includes at least two wall panel units each including said studs having connector pin openings therethrough, such two wall panel units being disposed with a side stud of one unit abutting a side stud of the second and with said openings in registry to receive a connector pin, a connector plate having an opening therein, said connector plate being mounted between said abutting studs of said two wall panel units with its opening aligned with the registering openings in the studs;

at least one pin being attached to said connector plate, said pin having an end portion with a double slot formed therein, said end portion extending transversely outwardly of said connected wall panel units to receive a side stud of a third wall unit positioned transversely to said adjacently positioned wall units; and a wedge element for releasably engaging said double slot of said pin end portion and said side stud of the third wall unit to releasably attach said third wall unit transversely to said adjacently positioned wall units.

4. The structure set forth in claim 3, including:

a second pin being attached to said connector plate and extending directionally opposite of said first-mentioned pin, said second pin having an end portion with a double slot extending outwardly of said first and second wall units combining with a wedge element to releasably connect a fourth wall unit with said other three wall units.

5. In the floor assembly of a modular housing system which includes a generally rectangular base, a plurality of floor panel framing units including suitably interconnected frame members disposed on the base and a sheet of weight supportive material disposed on each framing unit:

sheet connector means releasably connecting said sheet of weight supportive material and said floor panel framing unit, said sheet connector means including a plurality of lock connectors wherein each lock connector includes:

a lock sleeve positioned in a recess in a floor unit frame member, said lock sleeve being aligned with an opening in said sheet; and a fastening element mounted in said sheet opening and extending into said recess in which said lock sleeve is positioned, said fastening element being movable between a locked position in which said fastening element engages said lock sleeve and an unlocked position in which said fastening element is out of engagement with said lock sleeve so that said sheet is removable.

6. The structure set forth in claim 5, wherein:

a plug is mounted with said fastening element to fill said opening in said sheet;

said lock sleeve including a slot therein and having a cleat portion engaging said frame member to hold in lock sleeve in said recess;

said fastening element includes a shaft portion mounted with said plug and a radially extending end portion which is movable in said slot to engage said lock sleeve; and said slot having an inclined surface having notches therein to receive and hold said radially extending end portion of said fastening element.

7. A deviation connector for wall units of a modular housing system wherein a pair of adjacent wall units are disposed in side-by-side abutting relationship and are releasably connected together by connecting means which include an elongated pin extending transversely through abutting side studs of such pair of wall units, said deviation connector comprising:

a thin plate member adapted to be received between said abutting end studs and having an opening therethrough to receive said elongated pin, and a pin attached to and extending from said plate member, said pin having an end spaced from said plate member and adapted to engage a releasable wedge fastening member, whereby an additional framing member such as the end stud of a third wall unit may be butted against the edges of said first studs and receive a portion of the pin of the deviation connector in an appropriate lateral opening, the pin projecting through the third stud and receiving the fastening member to releasably clamp the third stud to the pair of studs.

8. A deviation connector for wall units of a modular housing system wherein a pair of adjacent wall units are disposed in side-by-side abutting relationship and are releasably connected together by connecting means which include an elongated pin extending transversely through abutting side studs of such pair of wall units, said deviation connector comprising:

a thin plate member adapted to be received between said abutting end studs, and a pair of pins attached to and extending from opposed sides of said plate member, each said pin having an end spaced from said plate member and adapted to engage a releasable wedge fastening member, whereby a pair of additional framing member such as the end studs of third and fourth wall units may be butted against the edges of said first studs and receive portion of the pins of the deviation connector in apparopriate lateral openings, the pins projecting through the third and fourth studs and receiving the fastening members to releasably clamp the third and fourth stud to the original pair of studs.

* * * * *